United States Patent
Moon et al.

(10) Patent No.: US 11,990,610 B2
(45) Date of Patent: May 21, 2024

(54) NEGATIVE ELECTRODE ACTIVE MATERIAL FOR SECONDARY BATTERY AND METHOD OF MANUFACTURING THE SAME

(71) Applicant: SK ON CO., LTD., Seoul (KR)

(72) Inventors: Joon Hyung Moon, Daejeon (KR); Eun Jun Park, Daejeon (KR); Ju Ho Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/194,508

(22) Filed: Mar. 31, 2023

(65) Prior Publication Data

US 2023/0402586 A1    Dec. 14, 2023

(30) Foreign Application Priority Data

Apr. 1, 2022    (KR) .................. 10-2022-0040992

(51) Int. Cl.

| | | |
|---|---|---|
| *H01M 4/48* | (2010.01) | |
| *H01M 4/04* | (2006.01) | |
| *H01M 4/36* | (2006.01) | |
| *H01M 4/485* | (2010.01) | |
| *H01M 4/58* | (2010.01) | |
| *H01M 4/60* | (2006.01) | |
| *H01M 4/62* | (2006.01) | |
| *H01M 10/052* | (2010.01) | |
| *H01M 4/02* | (2006.01) | |

(52) U.S. Cl.
CPC ......... *H01M 4/366* (2013.01); *H01M 4/0471* (2013.01); *H01M 4/364* (2013.01); *H01M 4/485* (2013.01); *H01M 4/5825* (2013.01); *H01M 4/602* (2013.01); *H01M 4/625* (2013.01); *H01M 10/052* (2013.01); *H01M 2004/021* (2013.01); *H01M 2004/027* (2013.01)

(58) Field of Classification Search
CPC .... H01M 4/366; H01M 4/0471; H01M 4/364; H01M 4/485; H01M 4/5825; H01M 4/602; H01M 4/625; H01M 10/052; H01M 2004/021; H01M 2004/027
See application file for complete search history.

(56) References Cited

U.S. PATENT DOCUMENTS

| | | |
|---|---|---|
| 2019/0334167 A1 | 10/2019 | Kamo et al. |
| 2020/0067088 A1 | 2/2020 | Kim et al. |
| 2020/0350571 A1 | 11/2020 | Lee et al. |

FOREIGN PATENT DOCUMENTS

| | | |
|---|---|---|
| CN | 110364700 A | 10/2019 |
| KR | 10-2014-0106292 A | 9/2014 |
| KR | 10-2015-0027093 A | 3/2015 |
| KR | 10-2015-0040141 A | 4/2015 |
| KR | 10-201-0035184 A | 4/2018 |
| KR | 10-20180114035 A | 10/2018 |
| KR | 10-2018-0122962 A | 11/2018 |
| KR | 10-2019-0060698 A | 6/2019 |
| KR | 10-2020-0061127 A | 6/2020 |
| KR | 10-2021-0093830 A | 7/2021 |

OTHER PUBLICATIONS

Extended European Search Report for European Patent Application No. 23165012.8, dated Aug. 11, 2023 (10 pages).
Yim, T et al., "Effect of binder properties on electrochemical performance for silicon-graphite anode: Method and application of binder screening, " Electrochimica Acta 136 (2014) 112-120.

*Primary Examiner* — Cynthia K Walls
(74) *Attorney, Agent, or Firm* — Perkins Coie LLP

(57) ABSTRACT

Provided is a negative electrode active material for a secondary battery including a core-shell composite including: a core including a silicon oxide ($SiO_x$, $0<x\leq2$) and a metal silicate in at least a part of the silicon oxide; and a shell including a metal-substituted organic compound, wherein the metal of the metal silicate and the substituted metal of the organic compound are independent of each other, wherein each of the metal of the metal silicate and the substituted metal of the organic compound includes an alkali metal or an alkaline earth metal.

20 Claims, No Drawings

NEGATIVE ELECTRODE ACTIVE MATERIAL FOR SECONDARY BATTERY AND METHOD OF MANUFACTURING THE SAME

CROSS-REFERENCE TO RELATED APPLICATIONS

This application claims priority under 35 U.S.C. § 119 to Korean Patent Application No. 10-2022-0040992, filed on Apr. 1, 2022, in the Korean Intellectual Property Office, the disclosure of which is incorporated herein by reference in its entirety.

TECHNICAL FIELD

The following disclosure relates to a negative electrode active material for a secondary battery and a method of manufacturing the same.

BACKGROUND

Recently, as an issue of global warming arises, a demand for environmentally friendly technologies is rapidly increasing in response thereto. In particular, as a technical demand for electric vehicles and energy storage systems (ESS) increases, a demand for rechargeable lithium secondary batteries, which is in the spotlight as an energy storage device, is exploding. Therefore, studies to improve the energy density of the lithium secondary batteries for high capacity batteries are in progress.

SUMMARY

An embodiment of the present disclosure is directed to providing a negative electrode active material for improving initial efficiency and capacity, and also improving life characteristics.

Another embodiment of the present disclosure is directed to providing a negative electrode active material for removing a residual metal compound remaining on the surface of metal-pretreated silicon compound particles to suppress an increase in slurry pH by the residual metal compound and a side reaction with an electrolyte occurring in a charge and discharge process and improving slurry stability and life characteristics.

In one general aspect, a negative electrode active material for a secondary battery includes a core-shell composite including: a core including a silicon oxide ($SiO_x$, $0<x\leq 2$) and a metal silicate in at least a part of the silicon oxide; and a shell including a metal-substituted organic compound, wherein the metal of the metal silicate and the substituted metal of the organic compound are independently of each other an alkali metal or an alkaline earth metal.

In addition, according to an exemplary embodiment of the present disclosure, the metal of the metal silicate and the substituted metal of the organic compound may be the same.

In addition, according to an exemplary embodiment of the present disclosure, a concentration of the substituted metal on an outer surface of the core-shell composite may be lower than a concentration of the substituted metal in an interface between the core and the shell, based on a cross-section through the center of the core-shell composite.

In addition, according to an exemplary embodiment of the present disclosure, the value of the following Equation (1) may be 0.02 to 0.18 in XPS analysis of the surface of the core-shell composite:

$$[M]/[C] \quad (1)$$

wherein M is a substituted metal of the organic compound, [M] is an M content (at %) measured by XPS analysis, and [C] is a C content (at %) measured by XPS analysis.

In addition, according to an exemplary embodiment of the present disclosure, the metal silicate may be one or more selected from the group consisting of lithium silicate, sodium silicate, potassium silicate, and magnesium silicate.

In addition, according to an exemplary embodiment of the present disclosure, the metal silicate may be included at 10 to 95 parts by weight with respect to 100 parts by weight of the silicon oxide.

In addition, according to an exemplary embodiment of the present disclosure, the organic compound may be an aqueous organic compound including one or more functional groups selected from the group consisting of a hydroxyl group, a carboxyl group, an amine group, and an amide group.

In addition, according to an exemplary embodiment of the present disclosure, the organic compound may include a catechol-based compound.

In addition, according to an exemplary embodiment of the present disclosure, the organic compound may be one or more aqueous polymers selected from the group consisting of polyacrylic acid (PAA), polyvinyl alcohol (PVA), carboxymethyl cellulose (CMC), hydroxypropyl cellulose (HPC), regenerated cellulose, starch, alginic acid, guar gum, gum arabic, and polyvinyl pyrrolidone (PVP).

In addition, according to an exemplary embodiment of the present disclosure, the shell may have an average thickness of 0.1 to 100 nm.

In addition, according to an exemplary embodiment of the present disclosure, in the core-shell composite, a weight ratio of the shell to the core may be 0.1 to 10.

In addition, according to an exemplary embodiment of the present disclosure, the core-shell composite may further include amorphous carbon.

In another general aspect, a method of manufacturing a negative electrode active material for a secondary battery includes: a) a pretreatment process of mixing a silicon compound and an alkali metal or alkaline earth metal precursor and performing a heat treatment to dope a metal into the silicon compound; and b) a composite production process of mixing the metal-doped silicon compound with an organic compound and performing a heat treatment to prepare a composite.

In addition, according to an exemplary embodiment of the present disclosure, the alkali metal or alkaline earth metal precursor of the pretreatment process of a) may include hydrides, hydroxides, oxides, and carbonates of metals including one or more selected from the group consisting of Li, Na, Mg, and K; or metal particles including one or more selected from the group consisting of Li, Na, Mg, and K.

In addition, according to an exemplary embodiment of the present disclosure, the pretreatment process of a) may include a heat treatment at 500 to 1000° C. under an inert atmosphere.

In addition, according to an exemplary embodiment of the present disclosure, in the composite production process of b), the organic compound may be included at 5 to 50 wt % based on the total weight of the silicon compound and the organic compound.

In addition, according to an exemplary embodiment of the present disclosure, the composite production process of b) may include a heat treatment at 80 to 120° C. under an inert atmosphere.

In still another general aspect, a negative electrode for a secondary battery includes: one of the negative electrode active materials of the exemplary embodiments described above.

Other features and aspects will be apparent from the following detailed description, the drawings, and the claims.

DETAILED DESCRIPTION OF EMBODIMENTS

Some commercialized secondary batteries commonly use a graphite active material such as natural graphite and artificial graphite, but such batteries in various implementations may exhibit a battery energy density due to the low storage capacity of the graphite (e.g., around 372 mAh/g). a Si-based material having a high theoretical capacity (3580 mAh/g) is emerging as one of solutions. In some battery designs, the Si-based material may exhibit a disadvantage of deteriorated battery life characteristics due to a large volume expansion (~400%) in a repeated charge and discharge process. To address this undesired large volume expansion of the Si material, a $SiO_x$ material which has a lower volume expansion rate than Si has been developed. Though the $SiO_x$ material shows excellent life characteristics due to its low volume expansion rate, it can be difficult to apply the $SiO_x$ material to industrial lithium secondary batteries due to the unique low initial coulombic efficiency (ICE) by initial formation of an irreversible phase.

The technology in the present disclosure can be used to provide negative electrode active materials for improving the battery efficiency, battery capacity, and battery life.

Advantages and features of the present disclosure and methods to achieve them will become apparent from the following exemplary embodiments described in detail with reference to the accompanying drawings. However, the present disclosure is not limited to the exemplary embodiments disclosed below, but will be implemented in various forms. The exemplary embodiments of the present disclosure make the present disclosure thorough and are provided so that those skilled in the art can easily understand the scope of the present disclosure. Therefore, the present disclosure will be defined by the scope of the appended claims. Detailed description for carrying out the present disclosure will be provided with reference to the accompanying drawings below. Identical member numbers refer to identical constituent elements regardless of the drawings.

Unless otherwise defined herein, all terms used herein (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

In the present specification, an average particle size may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample according to the KS A ISO 13320-1 standard and using Mastersizer 3000 from Malvern Panalytical Ltd. Specifically, a volume density may be measured after dispersion is performed using ethanol as a solvent, and, if necessary, using an ultrasonic disperser.

The present exemplary embodiment provides a negative electrode active material for a secondary battery including a core-shell composite including: a core including a silicon oxide ($SiO_x$, 0<x≤2) and a metal silicate in at least a part of the silicon oxide; and a shell including a metal-substituted organic compound. In some implementations, the metal of the metal silicate and the substituted metal of the organic compound are independent of each other. In some implementations, each of the metal of the metal silicate and the substituted metal of the organic compound may include an alkali metal or an alkaline earth metal. The shell is formed outside the core to cover the outer surface of the core and, in various implementations, the exterior of the core can be enclosed by the shell to form the core-shell structure.

In some implementations, 80 to 99 parts by weight, 90 to 99 parts by weight, or 95 to 99 parts by weight of the silicon oxide may be included with respect to 100 parts by weight of the core-shell composite. The material of the core of the core-shell composite may have an average particle diameter of 2 to 30 μm or 5 to 10 μm.

The silicon oxide includes a metal silicate in at least a part thereof, and specifically, 10 to 95 parts by weight, 30 to 90 parts by weight, or 50 to 90 parts by weight of the metal silicate may be included with respect to 100 parts by weight of the silicon oxide. Within the range, formation of an initial irreversible phase of the silicon oxide occurring during initial charge and discharge may be suppressed to increase initial efficiency and capacity.

The metal silicate may be one or more selected from the group consisting of lithium silicate, sodium silicate, potassium silicate, and magnesium silicate.

In an exemplary embodiment, the metal silicate may be a lithium silicate.

The lithium silicate may include, as a non-limiting example, at least one lithium silicate selected from $Li_2SiO_3$, $Li_2Si_2O_5$, and $Li_4SiO_4$. When forming a $Li_2SiO_3$ phase, a smaller amount of Si is consumed than in forming a lithium silicate phase such as $Li_2Si_2O_5$, and thus, capacity and efficiency characteristics may be improved and a serious change in Si volume is mitigated during a battery cycle life, which is advantageous for improving life characteristics. Meanwhile, since a $Li_4SiO_4$ phase has a high reactivity with moisture, it is difficult to adjust the physical properties of a slurry in manufacture of an electrode, and thus, the $Li_4SiO_4$ phase is not preferred.

According to an exemplary embodiment, the $Li_4SiO_4$ may be included at 25 parts by weight or less, 10 parts by weight or less, 5 parts by weight or less, or less than 1 part by weight with respect to 100 parts by weight of the silicon oxide. Since the $Li_4SiO_4$ phase has irreversible characteristics to a Li ion and is vulnerable to moisture, it is not preferred as an active material of a negative electrode using a water-based binder. Within the range of the Li4SiO4 phase, water resistance of a negative electrode slurry may be improved.

According to an exemplary embodiment, the metal silicate may be formed by a pretreatment process of mixing a silicon compound and an alkali metal or alkaline earth metal precursor and then performing a heat treatment to dope a metal into a silicon compound. In addition, after performing the pretreatment process, a residual metal compound which does not react during the pretreatment process and remains may be present on the surface of the silicon compound. As an example, the residual metal compound may be one or more selected from the group consisting of MOH and $MCO_3$. The metal M in the residual metal compound may be an alkali metal or alkaline earth metal, and specifically, may include one or more selected from the group consisting of Li, Na, Mg, and K.

When the residual metal compound is dissolved in a solvent in a process of preparing a negative electrode slurry including a negative electrode active material, the pH of the negative electrode slurry may be increased, and the increased pH contracts the chain of a polymer binder which is an essential constituent of the slurry to cause a decrease in adhesive strength between a current collector and a negative electrode active material layer due to a decrease in the viscosity of the slurry. In addition, the elution of the residual metal compound in the negative electrode slurry described above may oxidize a Si component of the silicon oxide which is a negative electrode active material to produce gas, which may cause deterioration of stability and performance of the negative electrode slurry.

According to an exemplary embodiment, by preparing a silicon oxide composite having a core-shell structure including a core including a silicon oxide and a metal silicate in at least a part of the silicon oxide and a shell including a metal-substituted organic compound, the residual metal compound may be effectively removed, and thus, the above problems may be solved.

Specifically, the core-shell composite according to an exemplary embodiment converts a high content of residual metal compound remaining on the surface of the silicon oxide described above into a metal-substituted organic compound, thereby effectively removing the residual metal compound. In addition, by including the shell including the metal-substituted organic compound, further elution of the metal silicate included in the internal core may be suppressed. The shell placed on the core may include a metal-substituted organic compound.

The organic compound may be an aqueous organic compound including one or more functional groups selected from the group consisting of a hydroxyl group, a carboxyl group, an amine group, and an amide group.

Specifically, the organic compound may include a catechol-based compound represented by the following Chemical Formula 1. The catechol-based compound may further include one or more functional groups selected from the group consisting of a hydroxyl group, a carboxyl group, an amine group, and an amide group, but is not limited thereto:

[Chemical Formula 1]

wherein $1 \leq w < 100$, $1 \leq x \leq 70$, $1 \leq y \leq 60$, and $0 \leq z \leq 30$.

As a preferred example, the catechol-based compound may contain a tannic acid. Thus, since a metal ion in the residual metal compound remaining on the surface of the silicon is bonded to a hydrophilic catechol group in the tannic acid to implement a high metal substitution degree of the tannic acid, the elution in a slurry of the residual metal compound may be effectively suppressed.

According to an exemplary embodiment, the organic compound may be one or more aqueous polymers selected from the group consisting of polyacrylic acid (PAA), polyvinyl alcohol (PVA), carboxymethyl cellulose (CMC), hydroxypropyl cellulose (HPC), regenerated cellulose, starch, alginic acid, guar gum, gum arabic, and polyvinyl pyrrolidone (PVP).

According to an exemplary embodiment, though the aqueous polymer is not particularly limited, its number average molecular weight may be 10,000 to 200,000 g/mol or 20,000 to 150,000 g/mol.

The residual metal compound is formed by a pretreatment process, and the metal in the residual metal compound is the same as the metal of the metal silicate formed by the pretreatment process. According to an exemplary embodiment, the organic compound and the residual metal compound are reacted to substitute and remove the metal in the residual metal compound, thereby removing the residual metal compound. Here, the metal substituted in the organic compound may be the same as the metal in the residual metal compound.

Therefore, according to an exemplary embodiment, when a high content of the residual metal compound remaining on the surface of the silicon oxide described above is converted into a metal-substituted organic compound to effectively remove the residual metal compound, the substituted metal of the organic compound and the metal of the metal silicate may be the same.

As such, according to the present disclosure, the metal ion of the residual metal compound which is formed in the pretreatment process of the silicon oxide, remains on the surface of the silicon oxide, and thus, is required to be removed is converted into the substituted metal of the organic compound, thereby effectively suppressing elution in a slurry of the residual metal compound described above.

In addition, when the metal in the metal-substituted organic compound of the shell is obtained by conversion from the residual metal compound described above, according to an exemplary embodiment, a concentration of the substituted metal on an outer surface of the core-shell composite may be lower than a concentration of the substituted metal in an interface between the core and the shell, based on a cross-section through the center of the core-shell composite. That is to say, a gradient in which as a depth in a core direction from the outer surface of the core-shell composite increases, the substitution degree of the substituted metal increases may be formed. Accordingly, slurry stability may be improved while the high efficiency characteristics of the negative electrode active material for a secondary battery are maintained.

The concentration gradient of the substituted metal may be confirmed by the concentration profile of the substituted metal according to the depth obtained by XPS analysis of the core-shell composite (XPS depth profile). The position of the interface between the core and the shell may be a point at which a C content measured in the XPS depth profile is 20 at % or less. According to an example, the XPS analysis may be performed by setting the following conditions using the equipment of ESCALAB 250Xi available from Thermo Fisher Scientific:

X-ray generator: 100 W
Charge neutralization: Low energy ion & electron
Ar⁺ Gun: 100 eV–3 keV
Ar⁺ Cluster Gun Meanwhile, when the metal-substituted organic compound is formed by adding a metal or a metal precursor separately from the outside, the residual metal compound may not be removed, and the shell having the concentration gradient described above may not be formed. In this case, a gradient in which as the depth in a core direction from the outer surface of the core-shell composite increases, the substitution degree of the substituted metal decreases is formed.

In addition, when the metal in the metal-substituted organic compound of the shell is obtained by conversion from the residual metal compound described above, according to an exemplary embodiment of the present disclosure, the value of the following Equation (1) may be 0.02 to 0.18 in XPS analysis of the surface of the core-shell composite:

$$[M]/[C] \tag{1}$$

wherein M is a substituted metal of the organic compound, [M] is an M content (at %) measured by XPS analysis, and [C] is a C content (at %) measured by XPS analysis.

According to an example, the XPS analysis may be performed by setting the following conditions using the equipment of ESCALAB 250Xi available from Thermo Fisher Scientific:

X-ray generator: 100 W
Charge neutralization: Low energy ion & electron
$Ar^+$ Gun: 100 eV–3 keV
$Ar^+$ Cluster Gun When the value of Equation (1) is less than 0.02, the organic compound substitutes and removes the metal of the residual metal compound, but also excessively substitutes and removes even the metal in the metal silicate for initial efficiency, and as a result, the initial efficiency and the capacity of a battery may be rather deteriorated. However, when the value of Equation (1) is more than 0.18, the residual metal compound is not removed and is present excessively on the surface of the core, and thus, the problems of a slurry pH increase by the residual metal compound and a side reaction with an electrolyte occurring in a charge and discharge process may not be solved.

Referring to the reason for limiting the value of Equation (1), according to a preferred exemplary embodiment, the value of Equation (1) may be 0.05 to 0.18, 0.02 to 0.16, or 0.05 to 0.16.

According to an exemplary embodiment, in Equation (1), [M] may be 3 to 15 at % or 5 to 15 at %, but is not particularly limited thereto.

According to an exemplary embodiment, in Equation (1), [C] may be 70 to 90 at % or 70 to 85 at %, but is not particularly limited thereto.

It should be noted that the metal-substituted organic compound described above is not necessarily included only in the shell of the core-shell composite, and may be partly included in the core.

According to an exemplary embodiment of the present disclosure, the content of the residual metal compound in the core-shell composite may be lowered to less than 5 wt %, specifically to 0.1 to 1.5 wt %, and thus, the residual metal compound may be substantially completely removed. In addition, according to an exemplary embodiment of the present disclosure, the surface structure of the core-shell composite may be stabilized to improve battery capacity and life characteristics.

According to an exemplary embodiment, an average thickness of the shell may be 0.1 to 100 nm. The average thickness of the sell for suppressing additional elution of the metal silicate included in the core may be 0.1 nm or more. However, when the average thickness of the shell is excessive, the capacity may be lowered, and thus, the average thickness of the shell may be 100 nm or less. From the point of view described above, the average thickness of the shell according to a preferred exemplary embodiment may be 1 to 10 nm or 2 to 5 nm.

According to an exemplary embodiment, in the core-shell composite, a weight ratio of the shell to the core may be 0.1 to 10. For removing the residual metal compound remaining on the surface of the silicon oxide, the weight ratio of the shell to the core may be 0.1 or more. However, when the weight ratio of the shell to the core is more than 10, the capacity may be lowered, which is not preferred. From the point of view described above, the weight ratio of the shell to the core according to a preferred exemplary embodiment may be 2 to 5.

According to an exemplary embodiment, the core-shell composite may optionally further include amorphous carbon. An example of the amorphous carbon may include soft carbon, hard carbon, a mesophase pitch carbide, calcined coke, and the like.

According to an exemplary embodiment, the amorphous carbon may be included at 3 to 25 parts by weight, 4 to 15 parts by weight, or 5 to 10 parts by weight with respect to 100 parts by weight of the core-shell composite. As an example, the core-shell composite may include a coating layer including the amorphous carbon, and the coating layer may have an average thickness of 0.1 to 100 nm. Within the range, the electrical conductivity of the core-shell composite particles may be improved, and the volume expansion of the negative electrode active material including the core-shell composite may be relieved.

The negative electrode active material may further include one or more graphite-based materials selected from the group consisting of natural graphite and artificial graphite. Specifically, the graphite-based material is a material capable of reversibly inserting/desorbing a lithium ion, and may have an amorphous, plate, flake, spherical, or fibrous shape.

The present disclosure provides a method of manufacturing a negative electrode active material for a secondary battery including: a) a pretreatment process of mixing a silicon compound and an alkali metal or alkaline earth metal precursor and performing a heat treatment to dope a metal into the silicon compound; and b) a composite production process of mixing the metal-doped silicon compound with an organic compound and performing a heat treatment to prepare a composite. The composite may have a core-shell structure including a core including a metal-doped silicon compound and a shell including an organic compound.

The process of a) is a pretreatment process of a silicon compound, and may include a-1) preparing a silicon compound; and a-2) doping a metal into the silicon compound to prepare a pretreated silicon compound.

According to an exemplary embodiment, the silicon compound prepared in the process of a-1) may include $SiO_x$ (0<x≤2); and one or more of Si, a Si-containing alloy, and a Si/C composite. The Si-containing alloy may be, as a non-limiting example, a Si-Q alloy. Q is an element selected from the group consisting of alkali metals, alkaline earth metals, group 13 elements, group 14 elements other than Si, group 15 elements, group 16 elements, transition metals, rare earth elements, and combinations thereof. The element Q may be, as a non-limiting example, selected from the group consisting of Li, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

According to an exemplary embodiment, the process of a-1) may include mixing Si powder and $SiO_2$ powder by appropriately adjusting a mixing ratio thereof so that a mole ratio of Si and O of $SiO_x$ may be formed, and then performing a heat treatment at a temperature of 500 to 1600° C. under an inert atmosphere and reduced pressure. Here, the heat treatment may be performed for 1 to 12 hours or 1 to 8 hours. The prepared silicon compound may be produced into silicon compound particles by pulverization.

According to an exemplary embodiment, carbon coating in a small amount may be selectively performed on the silicon compound obtained by the process of a-1). According to a non-limiting example, the carbon coating may be performed by a CVD process. Though the CVD process conditions are not particularly limited, the process may be performed in a temperature range of 500 to 700° C., and the coated carbon here may be more than 0 wt % and 10 wt % or less or more than 0 wt % and 7 wt % or less, based on the total weight of the carbon-coated silicon compound.

The process of a-2), which is a process of doping a metal into the prepared silicon compound, is a pretreatment process of mixing a silicon compound and an alkali metal or an alkaline earth metal precursor and performing a heat treatment to dope a metal into the silicon compound. A metal silicate may be prepared in at least a part of the silicon compound by the process of a-2).

According to an exemplary embodiment, the metal silicate may be one or more selected from the group consisting of lithium silicate, sodium silicate, potassium silicate, and magnesium silicate. According to an exemplary embodiment, the metal silicate may be a lithium silicate, and the lithium silicate may include, as a non-limiting example, at least one lithium silicate selected from $Li_2SiO_3$, $Li_2Si_2O_5$, and $Li_4SiO_4$.

According to an exemplary embodiment, in the process of a-2), a metal/Si mole ratio in mixing the silicon compound and the alkali metal or alkaline earth metal precursor may be 0.3 to 1.0, 0.3 to 0.8, or 0.4 to 0.8.

According to an exemplary embodiment, the alkali metal or alkaline earth metal precursor may include hydrides, hydroxides, oxides, and carbonates of metals including one or more selected from the group consisting of Li, Na, Mg, and K; or metal particles including one or more selected from the group consisting of Li, Na, Mg, and K. Though it is not particularly limited, the lithium precursor may include one or more of LiOH, Li, LiH, $Li_2O$, and $Li_2CO_3$.

According to an exemplary embodiment, after mixing the silicon compound and the alkali metal or alkaline earth metal precursor, the mixture may be heat treated at 500° C. to 1200° C. or 500° C. to 1000° C. under an inert atmosphere. The heat treatment time may be 1 to 12 hours. When a metal doping process by an electrochemical method or a redox method is used, the metal silicate may be easily produced, but under the heat treatment conditions, a production rate of a metal silicate having a better relief effect to suppress the volume expansion of the silicon oxide, as a non-limiting example, $Li_2SiO_3$ and the like may be increased, which is advantageous for improving battery life characteristics.

According to an exemplary embodiment, the pretreated silicon compound obtained by the process of a) may have an average particle diameter (D50) of 5 to 10 μm or 5 to 8 μm.

Meanwhile, the silicon compound prepared by the process of a) may include a residual metal compound which is not reacted and remains during the process. The residual metal compound may include, as a non-limiting example, MOH or $MCO_3$. The metal M in the residual metal compound may be an alkali metal or alkaline earth metal, and specifically, may include one or more selected from the group consisting of Li, Na, Mg, and K. When Li is applied as a doping metal in the process of a), the residual metal compound may be, as a non-limiting example, at least one or more selected from LiOH, Li, LiH, $Li_2O$, and $Li_2CO_3$.

The process of b) is a composite production process of the metal-doped silicon compound and the organic compound, and may include b-1) mixing the silicon compound with an organic compound and b-2) heat treating the mixture. In the process of b), since the organic compound is the same as the organic compound included in the shell described above, the description thereof will be omitted for convenience.

The process of b-1) may include a process of mixing the silicon compound prepared in the process of a) and the organic compound by a liquid phase reaction. Specifically, the mixing may be performed using a common wet mixing method such as an agitator and an ultrasonic disperser in an aqueous organic compound solution at a concentration of 1 to 10%, but is not limited thereto.

Here, the organic compound may be included at 5 to 50 wt % based on the total weight of the silicon compound and the organic compound. When the content of the organic compound is less than 5 wt %, the amount of the organic compound for removing the residual metal compound may not be sufficiently secured. However, when the content of the organic compound is more than 50 wt %, it may be difficult to secure a sufficient capacity. From the point of view described above, according to a preferred exemplary embodiment, the organic compound may be included at 15 to 40 wt % based on the total weight of the silicon compound and the organic compound.

Meanwhile, an aqueous polymer such as polyacrylic acid is more easily attached to silicon compound particles and remains more easily with a solid content after filtration than a monomolecule such as tannic acid, and thus, it is necessary to appropriately adjust the capacity of the polymer since the amount may be lowered when added in a large amount. Considering this fact, according to the present disclosure, the content of the organic compound may be adjusted differently depending on the molecular weight of the organic compound.

According to an exemplary embodiment, when an aqueous polymer having a number average molecular weight of 10,000 to 200,000 g/mol is used, 5 to 30 wt %, preferably 10 to 20 wt % of the organic compound may be included based on the total weight of the silicon compound and the organic compound. However, when an organic compound having a number average molecular weight of less than 10,000 g/mol is used, 10 to 50 wt %, preferably 15 to 40 wt % of the organic compound may be included based on the total weight of the silicon compound and the organic compound.

After the mixing of the process of b-1), a filtration process is further included to remove a solvent. The method of the filtration process is not particularly limited, but according to a non-limiting example, a membrane filtration may be applied. By the filtration process, a part of the residual metal precursor described above included in the silicon oxide prepared in step a) may be removed with the solvent.

The process of b-2) is a heat treatment process, and may include a heat treatment at 80 to 150° C. under an inert atmosphere. Here, a heat treatment time may be 1 to 12 hours or 1 to 8 hours. Under the conditions, the residual metal compound contained in the silicon compound may be converted into the metal-substituted organic compound and removed.

The present exemplary embodiment also provides a secondary battery including a negative electrode including the negative electrode active material according to an exemplary embodiment of the present disclosure; and a positive electrode.

The negative electrode includes: a current collector; and a negative electrode active material layer including the negative electrode active material and a binder, disposed on the current collector.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes a negative electrode active material and a binder, and optionally, may further include a conductive material.

The negative electrode active material includes the core-shell composite according to an exemplary embodiment of the exemplary embodiments described above, and optionally, may further include a material capable of reversibly inserting/desorbing a lithium ion, a lithium metal, an alloy of lithium metal, a material capable of being doped and dedoped on lithium, or a transition metal oxide.

An example of the material capable of reversibly inserting/desorbing a lithium ion may include a carbon material, that is, a carbon-based negative electrode active material which is commonly used in the lithium secondary battery. A representative example of the carbon-based negative electrode active material may include crystalline carbon, amorphous carbon, or a combination thereof. An example of the crystalline carbon may include graphite such as amorphous, plate-shaped, flake-shaped, spherical, or fibrous natural graphite or artificial graphite, and an example of the amorphous carbon may include soft carbon or hard carbon, a mesophase pitch carbide, calcined coke, and the like.

The alloy of lithium metal may be an alloy containing lithium; and one or more metals selected from the group consisting of Na, K, Rb, Cs, Fr, Be, Mg, Ca, Sr, Si, Sb, Pb, In, Zn, Ba, Ra, Ge, Al, and Sn.

The material capable of being doped and dedoped on lithium may be a silicon-based material, as a non-limiting example, Si, $SiO_x$ (0<x<2), a Si-Q alloy (Q is an element selected from the group consisting of alkali metals, alkaline earth metals, Group 13 elements, Group 14 elements, Group 15 elements, Group 16 elements, transition metals, rare-earth elements, and combinations thereof, but is not Si), a Si-carbon composite, Sn, $SnO_2$, a Sn—R alloy (R is an element selected from the group consisting of alkali metals, alkaline earth metals, Group 13 elements, Group 14 elements, Group 15 elements, Group 16 elements, transition metals, rare-earth elements, and combinations thereof, but is not Sn), a Sn-carbon composite, and the like, and also, a mixture of at least one of them and $SiO_2$ may be used. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

The content of the negative electrode active material may be 70 wt % or more or 75 wt % or more with respect to the total weight of the negative electrode active material layer, but is not limited thereto.

The binder is not particularly limited as long as it is a common binder which adheres electrode active material particles well to each other and adheres the electrode active material to the current collector well. As an example, the binder may be an aqueous binder, specifically, styrene-butadiene rubber, acrylated styrene-butadiene rubber, polyvinyl alcohol, sodium polyacrylate, a copolymer of propylene and an olefin having 2 to 8 carbon atoms, a copolymer of (meth)acryl acid and (meth)acrylic acid alkyl ester, or a combination thereof. The content of the binder may be 1 to 10 wt % or 1 to 8 wt % with respect to the total weight of the negative electrode active material layer, but is not limited thereto.

When the aqueous binder is used, the aqueous binder may adhere the electrode active material to the current collector well without affecting the viscosity of a slurry, which is thus preferred. However, since the slurry may easily gelate by an electrode active material and a conductive material which are fine particles, a thickener for imparting viscosity to the slurry to prepare a stable slurry may be optionally further included. As an example, one or more of cellulose-based compounds, specifically, carboxymethyl cellulose, hydroxypropylmethyl cellulose, methyl cellulose, and alkali metal salts thereof may be mixed and used as the thickener. As the alkali metal, Na, K, or Li may be used. The content of the thickener may be 1 to 10 wt % or 1 to 8 wt % with respect to the total weight of the negative electrode active material layer, but is not limited thereto.

The solvent may be any solvent as long as it is a solvent commonly used in an electrode slurry. Specifically, a solvent for a negative electrode may be at least one selected from the group consisting of water, pure water, deionized water, distilled water, ethanol, isopropanol, methanol, acetone, n-propanol, and t-butanol, but is not limited thereto.

The conductive material is used for imparting conductivity to an electrode, and any conductive material may be used as long as it is an electroconductive material which does not cause a chemical change in the battery to be configured. An example of the conductive material may include conductive materials including a carbon-based material such as natural graphite, artificial graphite, carbon black, acetylene black, ketjen black, and carbon fiber; a metal-based material such as metal powder or metal fiber of copper, nickel, aluminum, silver, and the like; a conductive polymer such as a polyphenylene derivative; or a mixture thereof. The content of the binder may be 1 to 15 wt % or 1 to 12 wt % with respect to the total weight of the negative electrode active material layer, but is not limited thereto.

The contents of the binder and the conductive material in the negative electrode active material layer may be 1 to 25 wt % or 1 to 20 wt %, respectively, with respect to the total weight of the negative electrode active material layer, but are not limited thereto.

The positive electrode includes a current collector, and a positive electrode active material layer formed by applying a positive electrode slurry including a positive electrode active material on the current collector.

The current collector may be the negative electrode current collector described above, and any known material in the art may be used, but the present disclosure is not limited thereto.

The positive electrode active material layer includes a positive electrode active material, and optionally, may further include a binder and a conductive material. The positive electrode active material may be any positive electrode active material known in the art, and as a non-limiting example, it is preferred to use a composite oxide of lithium with a metal selected from cobalt, manganese, nickel, and a combination thereof, but the present disclosure is not limited thereto.

The binder and the conductive material may be the negative electrode binder and the negative electrode conductive material described above, and any known material in the art may be used, but the present disclosure is not limited thereto.

The secondary battery may further include a separator disposed between the negative electrode and the positive electrode; and an electrolyte solution.

The separator may be, as a non-limiting example, selected from glass fiber, polyester, polyethylene, polypropylene, polytetrafluoroethylene, or a combination thereof, and may be in the form of nonwoven fabric or woven fabric. As a non-limiting example, in the lithium secondary battery, a polyolefin-based polymer separator such as polyethylene and polypropylene may be mainly used, a separator coated with a composition including a ceramic component or a polymer material may be used for securing thermal resistance or mechanical strength, and optionally, the separator may be used in a single layer or a multilayer structure, and any separator known in the art may be used, but the present disclosure is not limited thereto.

The electrolyte solution includes an organic solvent and a lithium salt.

The organic solvent serves as a medium in which ions involved in the electrochemical reaction of the battery may move, and as a non-limiting example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any organic solvent known in the art may be used, but the present disclosure is not limited thereto.

The lithium salt is a material which is dissolved in the organic solvent and acts as a source of lithium ions in the battery to allow basic operation of the lithium secondary battery, and promotes movement of lithium ions between a positive electrode and a negative electrode. An example of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but the present disclosure is not limited thereto.

A concentration of the lithium salt may be in a range of 0.1 M to 2.0 M. When the lithium salt concentration is within the range, the electrolyte solution has appropriate conductivity and viscosity, and thus, excellent electrolyte solution performance may be shown and lithium ions may effectively move.

In addition, the electrolyte solution may further include pyridine, triethyl phosphate, triethanolamine, cyclic ether, ethylene diamine, n-glyme, hexamethylphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge and discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate (FPC), and the like may be further included for improving conservation properties at a high temperature.

The method of manufacturing a secondary battery according to the present disclosure for achieving the above object may include laminating the manufactured negative electrode, a separator, and a positive electrode in this order to form an electrode assembly, placing the manufactured electrode assembly in a cylindrical battery case or an angled battery case, and then injecting an electrolyte solution. Otherwise, the secondary battery may be manufactured by producing the electrode assembly by lamination, immersing the assembly in the electrolyte solution, placing the resultant product in a battery case, and sealing the case.

As the battery case used in the present disclosure, those commonly used in the art may be adopted, there is no limitation in appearance depending on the battery use, and as a non-limiting example, a cylindrical shape, an angled shape, a pouch shape, a coin shape, or the like using a can may be used.

The secondary battery according to the present disclosure may be used in a battery cell used as a power supply of a small device, and also may be preferably used as a unit cell in a medium or large battery module including a plurality of battery cells. A preferred example of the medium or large device may include an electric automobile, a hybrid electric automobile, a plug-in hybrid electric automobile, a system for power storage, and the like, but is not limited thereto.

Hereinafter, the preferred examples and the comparative examples of the present disclosure will be described. However, the following examples are only a preferred example of the present disclosure, and the present disclosure is not limited thereto.

EXAMPLES

Example 1 Manufacture a) Pretreatment Process a-1) Preparation of Silicon Compound A raw material in which silicon and silicon dioxide were mixed was introduced to a reaction furnace and evaporated at 600° C. for 5 hours under an atmosphere having a vacuum degree of 10 Pa, the resultant product was deposited on a suction plate and sufficiently cooled, and then a deposit was taken out and pulverized with a ball mill. The pulverized silicon compound particles were adjusted by sorting to obtain silicon compound particles having an average particle diameter (D50) of 6.7 μm. The obtained silicon compound particles were coated with carbon by a CVD process at 600° C. for 3 hours. At this time, coated carbon was 5 wt % based on the total weight of the carbon-coated silicon compound.

a-2) Metal (Li) Pretreatment Process

The thus-prepared silicon compound particles and LiOH powder were mixed at a Li/Si mole ratio of 0.75, and the mixed powder was filtered and then placed in an alumina crucible. Thereafter, it was heat-treated at 800° C. for 8 hours under a nitrogen gas atmosphere. Subsequently, the heat-treated powder was recovered and pulverized in a mortar, thereby doping the silicon compound with lithium. At this time, the doped silicon compound particles had an average particle diameter (D50) of about 6.7 μm.

b) Composite Production Process b-1) Mixing Process 80 wt % of the metal-pretreated silicon compound and 20 wt % of tannic acid as an organic compound were mixed by stirring. At this time, the wt % of the silicon compound and the tannic acid as an organic compound was derived based on the total weight of the silicon compound and the tannic acid. The content of the tannic acid was adjusted using an aqueous tannic acid solution having a concentration of 2%. Thereafter, the solvent was removed by a membrane filtration method.

b-2) Heat Treatment Process

A filtrate obtained by the membrane filtration method was heat treated at 120° C. for 2 hours under vacuum conditions to prepare a composite. The prepared composite had a core-shell structure including a core including a metal (Li)-doped silicon compound and a shell including a metal-substituted organic compound.

c) Manufacture of Negative Electrode 80 wt % of the thus-prepared composite, 10 wt % of a conductive material, carbon black Super C, 6 wt % of a thickener, carboxymethyl cellulose, and 4 wt % of a binder, styrene-butadiene rubber were mixed in distilled water to prepare a negative electrode slurry. The negative electrode was manufactured by a common process of applying the negative electrode slurry on a Cu foil current collector, and performing application and drying.

d) Manufacture of Half Battery

The negative electrode manufactured above and a lithium metal as a counter electrode were used, a PE separator was interposed between the negative electrode and the counter electrode, and then an electrolyte solution was injected to manufacture a CR2016 type coin cell. The assembled coin cell was paused at room temperature for 3 to 24 hours. At this time, the injected electrolyte solution was obtained by mixing 1.0 M $LiPF_6$ as a lithium salt with an organic solvent (EC:EMC=3:7 vol %) and mixing 2 vol % of FEC 2 as an electrolyte additive.

Comparative Example 1 Manufacture

Manufacture was performed under the same conditions as Example 1 a-2), except that the metal (Li) pretreatment process of a-2) was not performed and the mixing of b-2) was performed using an aqueous solution including 20 wt % of the tannic acid and 40 wt % of LiOH in the mixing process.

Evaluation Example

Evaluation Example 1: a-2) Evaluation of Properties Depending on Whether Metal (Li) Was Doped Analysis of Slurry Gassing Rate Each composite prepared in Example 1 and Comparative Example 1 was used to prepare a slurry by the following method. A slurry including 25 wt % of the prepared composite, 70 wt % of artificial graphite, 1.5 wt % of carboxymethyl cellulose, 2 wt % of styrene butadiene rubber, and 1.5 wt % of conductive material Super C and having a solid content of 40 wt % was prepared.

4 ml of the thus-prepared slurry was injected into a gastight syringe, and was allowed to stand at room temperature for 7 days with the inlet being sealed. Thereafter, a slurry gassing rate was calculated by the following Calculation Formula 1, and the results are shown in Table 1.

Slurry gassing rate=(slurry volume after 7 days−initial slurry volume)/(initial slurry volume)*100   [Calculation Formula 1]

Evaluation of Charge and Discharge Performance

Each half battery manufactured in Example 1 and Comparative Example 1 was charged at a constant current at room temperature (25° C.) until the voltage reached 0.01 V (vs. Li) at a current of 0.1 C rate, and then was charged with a constant voltage by cut-off at a current of 0.01 C rate while maintaining 0.01 V in a constant voltage mode. The battery was discharged at a constant current of 0.1 C rate until the voltage reached 1.5 V (vs. Li). The charge and discharge were set as one cycle, one more cycle of charge and discharge was identically performed, and then charge and discharge cycles in which the applied current was changed to 0.5 C during charge and discharge were performed, with a pause of 10 minutes between the cycles.

The charge and discharge efficiency and the discharge capacity of the first cycle of the cycles were indicated as an initial efficiency and an initial discharge capacity, respectively, and a percentage of the discharge capacity of 50 cycles compared with the initial discharge capacity was calculated as a capacity retention rate, and is shown in the following Table 1:

TABLE 1

| | Whether metal (Li) pretreatment was performed (○/X) | Slurry gassing rate (%) | Initial efficiency (%) | Initial discharge capacity (mAh/g) | Capacity retention rate (%) |
|---|---|---|---|---|---|
| Example 1 | ○ | 0 | 89.4 | 1428 | 91.2 |
| Comparative Example 1 | X | 120 | 70.2 | 1346 | 55.4 |

Referring to Table 1, Example 1 in which the lithium pretreatment process was performed showed higher initial efficiency than Comparative Example 1 in which the lithium pretreatment process was not performed, and showed an excellent capacity retention rate due to a low slurry gassing rate.

From the above results, Example 1 secured high initial efficiency through the lithium pretreatment process. In addition, by converting a residual lithium compound (e.g., LiOH and the like) contained in a silicon compound by the lithium pretreatment into a lithium-substituted organic compound by lithium substitution and removing the compound, a gassing problem caused by the residual lithium compound being eluted into the slurry was prevented to increase slurry stability, and thus, an excellent capacity retention rate was secured.

It is considered that the tannic acid in the shell of the composite of Example 1 was substituted with lithium of the residual lithium compound to increase slurry stability and improve a capacity retention rate. In this case, a gradient in which as the depth in a core direction from the outer surface of the core-shell composite increased, the substitution degree of the substituted lithium increased was formed. Accordingly, slurry stability was able to be improved while the high efficiency characteristics of the negative electrode active material were maintained.

However, in Comparative Example 1, since the lithium pretreatment process was not performed, an initial irreversible phase was formed and initial efficiency was poor. In addition, Comparative Example 1 was a composite having a core-shell structure including a shell including tannic acid on a core including the silicon compound, but the organic compound was substituted by lithium of the lithium compound added from the outside, and thus, a gradient in which as the depth in a core direction increased, the substitution degree of the substituted lithium decreased was formed. Accordingly, in Comparative Example 1, the organic compound (tannic acid) in the shell did not remove the residual lithium compound, slurry stability was poor, and a capacity retention rate was lowered.

Evaluation Example 2: Evaluation of Properties Depending on the Type and Content of Organic Compound Examples 2 to 11 Manufacture Half batteries were manufactured under the same conditions as Example 1, except that the type and content of organic compound were as listed in the following Table 2 in the mixing process of b-1).

Comparative Example 2 Manufacture

A half battery was manufactured under the same conditions as Example 1, except that 10 wt % of hydrochloric acid was used instead of 20 wt % of tannic acid and a hydrochloric aqueous solution having a concentration of 37% was used as the hydrochloric acid to adjust the content.

Comparative Example 3 Manufacture

A half battery was manufactured under the same conditions as Example 1, except that the composite production process of b) was not performed.

Evaluation Method

In the type of organic compound in the following Table 2, "TA" refers to a tannic acid having a number average molecular weight of 2,500 g/mol or less, "PAA" refers to a polyacrylic acid having a number average molecular weight of 10,000 to 200,000 g/mol, and "HC1" refers to a hydrochloric acid.

The content (wt %) of the organic compound in the following Table 2 refers to the content (wt %) of the organic compound based on the total weight of the silicon compound and the organic compound mixed in the process of b-1).

The surface XPS analysis of the following Table 2 was the result of performing XPS analysis on the surface of the core-shell composite prepared by the heat treatment process of b-2), in which [Li] refers to a Li content (at %) measured by XPS analysis and [C] refers to a C content (at %) measured by the XPS analysis. [Li]/[C] is a value derived by substituting a [Li] value and a [C] value derived above. At this time, the XPS analysis was performed by setting the following conditions using the equipment of ESCALAB 250Xi available from Thermo Fisher Scientific:

X-ray generator: 100 W

Charge neutralization: Low energy ion & electron $Ar^+$ Gun: 100 eV–3 keV $Ar^+$ Cluster Gun A slurry gassing rate, initial efficiency, initial discharge capacity, and capacity retention rate were derived in the same manner as in Evaluation Example 1, and the results are shown in the following Table 2:

TABLE 2

| | Type of organic compound | Content of Organic compound (wt %) | Surface XPS analysis | | | Slurry gassing rate (%) | Initial efficiency (%) | Initial discharge capacity (mAh/g) | Capacity retention rate (%) |
| --- | --- | --- | --- | --- | --- | --- | --- | --- | --- |
| | | | [Li] (at %) | [C] (at %) | [Li]/[C] | | | | |
| Example 1 | TA | 20 | 9 | 79 | 0.11 | 0% | 89.4 | 1428 | 91.2 |
| Example 2 | TA | 25 | 8 | 81 | 0.10 | 0% | 88.1 | 1382 | 86.6 |
| Example 3 | TA | 30 | 8 | 82 | 0.10 | 0% | 86.5 | 1335 | 84.4 |
| Example 4 | TA | 40 | 7 | 83 | 0.08 | 0% | 85.7 | 1243 | 80.8 |
| Example 5 | TA | 50 | 6 | 83 | 0.07 | 0% | 84.5 | 1134 | 73.6 |
| Example 6 | TA | 10 | 10 | 75 | 0.13 | ≥10% | 88.2 | 1438 | 82.4 |
| Example 7 | PAA | 10 | 11 | 76 | 0.14 | 0% | 89.5 | 1422 | 91.5 |
| Example 8 | PAA | 15 | 9 | 78 | 0.12 | 0% | 89.4 | 1413 | 90.4 |
| Example 9 | PAA | 20 | 9 | 80 | 0.11 | 0% | 88.7 | 1402 | 91.8 |
| Example 10 | PAA | 5 | 12 | 73 | 0.16 | >85% | 89.2 | 1423 | 83.2 |
| Example 11 | PAA | 30 | 8 | 81 | 0.10 | 0% | 87.7 | 1213 | 91.8 |
| Comparative Example 2 | HCl | 10 | 1 | 87 | 0.01 | ≥130% | 81.0 | 1410 | 78.4 |
| Comparative Example 3 | — | 0 | 16 | 70 | 0.20 | ≥276% | 87.8 | 1440 | 80.1 |

Referring to Table 2, Examples 1 to 11 which satisfied the type of organic compound and the content (wt %) of the organic compound defined in the present disclosure satisfied the [Li]/[C] value of 0.02 to 0.18 in the surface XPS analysis, suppressed slurry gassing, and had excellent initial efficiency, initial discharge capacity, and capacity retention rates.

Meanwhile, an aqueous polymer such as polyacrylic acid was more easily attached to silicon compound particles and remained more easily with a solid content after filtration than a monomolecule such as tannic acid, and thus, it was necessary to appropriately adjust the capacity of the polymer since the amount may be lowered when added in a large amount. In the point of view as such, in Examples 7 to 11 to which the polyacrylic acid of the polymer organic compound was added, the organic compound was added in a smaller amount, as compared with Examples 1 to 6 to which the tannic acid of the low molecular organic compound was added.

In Examples 1 to 6 to which the tannic acid of a low molecular organic compound was added, the content of the organic compound of Example 5 was higher than those of other Examples 1 to 4 and had a relatively poor discharge capacity. However, in Example 6, since the content of the organic compound was lower than those of other Examples 1 to 4, the amount of the organic compound for removing a residual metal compound was not sufficient, and thus, slurry stability was relatively poor.

In Examples 7 to 11 to which the polyacrylic acid as the polymer organic compound was added, the content of the organic compound of Example 11 was higher than those of other Examples 7 to 9 and had a relatively poor discharge capacity. However, in Example 10, since the content of the organic compound was lower than those of other Examples 7 to 9, the amount of the organic compound for removing a residual metal compound was not sufficient, and thus, slurry stability was relatively poor.

Comparative Example 2 is an example of using hydrochloric acid which is a strong acid, and LiOH as the residual metal compound was able to be removed and the like were able to be removed, but lithium silicate and the like in the active material were damaged to cause initial efficiency and life deterioration. In addition, since a strong acid material such as hydrochloric acid was not attached to silicon compound particles, it was impossible to form a composite having a core-shell composite. Thus, lithium silicate such as $Li_2Si_2O_5$, $Li_2SiO_3$, and $Li_4SiO_4$ present in an active material was not prevented from reacting with water when the slurry was allowed to stand for a long time, and thus, life deterioration such as lowered capacity retention rate by slurry gassing occurred.

In Comparative Example 3, since the composite production process was not performed at all, the residual metal compound was not removed, and further elution of lithium silicate was not suppressed due to a particle structure of the silicon compound alone having no shell, which caused life deterioration such as a lowered capacity retention rate due to a large amount of slurry gas produced.

The negative electrode active material for a lithium secondary battery according to the present disclosure may solve the problems of initial efficiency and capacity deterioration by the pretreatment process.

In addition, according to the present disclosure, a core-shell composite including a core including a silicon oxide and a metal silicate in at least a part of the silicon oxide and a shell including an organic compound is prepared by a composite production process to suppress the expansion of core particles in a repeated charge and discharge process, thereby improving battery stability and life characteristics.

Furthermore, the organic compound reacts with a residual metal compound which does not react in the pretreatment process and remains to adversely affect slurry stability and battery life characteristics to be substituted with a metal, thereby removing the residual metal compound. According to the present disclosure, the organic compound in the shell may remove the residual metal compound, thereby stabilizing a core surface to improve slurry stability and battery life characteristics.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery based energy storage systems (ESSs) to store renewable energy such as solar power and wind power.

Although the exemplary embodiments of the present disclosure have been described above, variations of the exemplary embodiments and other embodiments may be made in various forms different from each other based on what is disclosed in the present disclosure.

What is claimed is:

1. A negative electrode active material for a secondary battery comprising a core-shell composite including:
    a core including a silicon oxide ($SiO_x$, $0<x\leq2$) and a metal silicate in at least a part of the silicon oxide; and
    a shell outside the core and including a metal-substituted organic compound,
    wherein the metal of the metal silicate and the substituted metal of the organic compound are independent of each other, wherein each of the metal of the metal silicate and the substituted metal of the organic compound includes an alkali metal or an alkaline earth metal,
    wherein a concentration of the substituted metal on an outer surface of the core-shell composite is lower than a concentration of the substituted metal in an interface between the core and the shell, based on a cross-section through the center of the core-shell composite.

2. The negative electrode active material for a secondary battery of claim 1, wherein the metal of the metal silicate and the substituted metal of the organic compound are the same.

3. The negative electrode active material for a secondary battery of claim 1, wherein a value of the following Equation (1) is 0.02 to 0.18 in XPS analysis of a surface of the core-shell composite:

$$[M]/[C] \qquad (1)$$

wherein M is a substituted metal of the organic compound, [M] is an M content (at %) measured by XPS analysis, and [C] is a C content (at %) measured by XPS analysis.

4. The negative electrode active material for a secondary battery of claim 1, wherein the metal silicate is one or more selected from the group consisting of lithium silicate, sodium silicate, potassium silicate, and magnesium silicate.

5. The negative electrode active material for a secondary battery of claim 1, wherein the core includes 10 to 95 parts by weight of the metal silicate with respect to 100 parts by weight of the silicon oxide.

6. The negative electrode active material for a secondary battery of claim 1, wherein the organic compound is an aqueous organic compound including one or more functional groups selected from the group consisting of a hydroxyl group, a carboxyl group, an amine group, and an amide group.

7. The negative electrode active material for a secondary battery of claim 6, wherein the organic compound includes a catechol-based compound.

8. The negative electrode active material for a secondary battery of claim 6, wherein the organic compound is one or more aqueous polymers selected from the group consisting of polyacrylic acid (PAA), polyvinyl alcohol (PVA), carboxymethyl cellulose (CMC), hydroxypropyl cellulose (HPC), regenerated cellulose, starch, alginic acid, guar gum, gum arabic, and polyvinyl pyrrolidone (PVP).

9. The negative electrode active material for a secondary battery of claim 1, wherein the shell has an average thickness of 0.1 to 100 nm.

10. The negative electrode active material for a secondary battery of claim 1, wherein in the core-shell composite, a weight ratio of the shell to the core is 0.1 to 10.

11. The negative electrode active material for a secondary battery of claim 1, wherein the core-shell composite further includes amorphous carbon.

12. A secondary battery comprising a negative electrode including the negative electrode active material of claim 1.

13. A negative electrode active material for a secondary battery comprising a core-shell composite including:
   a core including a silicon oxide $SiO_x$ ($0<x\leq2$) and a metal silicate in at least a part of the silicon oxide; and
   a shell outside the core and including a metal-substituted organic compound that includes a metal and a catechol-based compound,
   wherein the metal of the metal silicate in the core and the metal of the metal-substituted organic compound in the shell are independent of each other, wherein each of the metal of the metal silicate and the metal of the metal-substituted organic compound includes an alkali metal or an alkaline earth metal.

14. The negative electrode active material for a secondary battery of claim 13, wherein the metal of the metal silicate and the metal of the metal-substituted organic compound are the same.

15. The negative electrode active material for a secondary battery of claim 13, wherein a concentration of the substituted metal on an outer surface of the core-shell composite is lower than a concentration of the substituted metal in an interface between the core and the shell, based on a cross-section through the center of the core-shell composite.

16. The negative electrode active material for a secondary battery of claim 13, wherein a value of the following Equation (1) is 0.02 to 0.18 in XPS analysis of a surface of the core-shell composite:

$$[M]/[C] \qquad (1)$$

wherein M is a substituted metal of the organic compound, [M] is an M content (at %) measured by XPS analysis, and [C] is a C content (at %) measured by XPS analysis.

17. The negative electrode active material for a secondary battery of claim 13, wherein the metal silicate is one or more selected from the group consisting of lithium silicate, sodium silicate, potassium silicate, and magnesium silicate.

18. The negative electrode active material for a secondary battery of claim 13, wherein the core includes 10 to 95 parts by weight of the metal silicate with respect to 100 parts by weight of the silicon oxide.

19. The negative electrode active material for a secondary battery of claim 13, wherein the organic compound is an aqueous organic compound including one or more functional groups selected from the group consisting of a hydroxyl group, a carboxyl group, an amine group, and an amide group.

20. The negative electrode active material for a secondary battery of claim 13, wherein the core-shell composite further includes amorphous carbon.

* * * * *